United States Patent [19]

Baker

[11] 3,794,856

[45] Feb. 26, 1974

[54] LOGICAL BOOTSTRAPPING IN SHIFT REGISTERS

[75] Inventor: Lamar T. Baker, West Islip, N.Y.

[73] Assignee: General Instrument Corporation, Newark, N.J.

[22] Filed: Nov. 24, 1972

[21] Appl. No.: 309,084

[52] U.S. Cl. .............................. 307/205, 307/221 C
[51] Int. Cl. .............................................. H03k 19/08
[58] Field of Search......307/205, 221 C, 251, 279, 307/304

[56] References Cited

UNITED STATES PATENTS

| | | | |
|---|---|---|---|
| 3,638,036 | 1/1972 | Zimbelmann | 307/221 C |
| 3,497,715 | 2/1970 | Yen | 307/221 C |
| 3,631,261 | 12/1971 | Heimbigner | 307/221 C |
| 3,551,692 | 12/1970 | Yen | 307/221 C |
| 3,526,783 | 9/1970 | Booher | 307/205 |
| 3,708,688 | 1/1973 | Yao | 307/205 |
| 3,601,627 | 8/1971 | Booher | 307/205 |

*Primary Examiner*—Rudolph V. Rolinec
*Assistant Examiner*—Ro E. Hart

[57] ABSTRACT

A novel booster circuit is disclosed which is effective to improve high and low frequency performance of synchronous MOS logic circuits. In a preferred embodiment, the circuit is effective to boost a logic "1" output from a logic stage by capacitively coupling a clock signal thereto just prior to sampling. The coupling capacitor comprises an MOS device having its gate connected to the output node, the clock signal source being selectively connected to the output circuit thereof through a switching device controlled by the level of the output signal. Upon the occurrence of a logic "1" output the gate to channel capacitance of the MOS device serves as a large coupling capacitance to which the clock signal is thereafter applied to boost the logic output prior to sampling by the next logic stage.

19 Claims, 3 Drawing Figures

LOGICAL BOOTSTRAPPING IN SHIFT REGISTERS

This invention relates to logic circuits are more particularly to an MOS logic circuit including a novel logical boot-strapping arrangement designed to reduce power and enhance low frequency operation.

Logic circuits of the type described are basic building blocks of digital data processing systems. In circuits of this type, the data is stored at one or more nodes at either of two discrete signal levels corresponding to either a logic "0" condition or a logic "1" condition (arbitrarily termed "false" and "true" conditions, respectively). The circuit is adapted to perform sequential logical operations upon incoming data and provide output data in accordance with such operations. Such circuits are embodied in shift registers, counters, adders, and in various gates for performing specific logical operations.

In recent years, a new technology has been developed in the semiconductor art in which a plurality of switching devices are fabricated to form an integrated circuit on a chip of semiconductor material. In the fabrication of these circuit chips, and particularly where utilized in logic circuits, insulated gate or metal oxide silicon (MOS) field effect transistors (FETs) have been found to be particulary effective as high-speed switching devices. These transistors are formed on a chip of semiconductor material by performing appropriate operations on suitably doped regions of the semiconductor substrate to produce the basic elements forming an individual FET. These elements include a control terminal generally termed the gate, and a pair of output terminals generally termed the source and drain respectively. In one type of FET if the signal at the gate is negative with respect to its output terminals, the output circuit between the source and the drain is closed, that is, the device is in the "on" state. If the signal at the gate is positive with respect to its output terminals, the output circuit is characterized by an extremely high impedance equivalent to an open circuit, that is, the device in in the "off" state. Another type of FET functions in just the opposite fashion. Thus, the FET operates as a high-speed switching device controlled by the signal level applied to its gate terminal. For purposes of explanation throughout this specification, the MOSFETs therein are described and illustrated as comprising the first type, that is, a logic "0" or more positive signal level refers to a level insufficient to turn a device "on" when applied to its gate terminal and a logic "1" or more negative signal level refers to a level which is sufficient to turn a device "on" when applied to its gate terminal.

Moreover, the terms "positive" and "negative" when used in reference to a signal or charge are relative and refer to the more positive or negative of the two operative signal levels as the case may be. No external bias signals are required to operate the FET as a switching device. These devices are well suited for the mechanization of complex logic functions on a single substrate of semiconductor material by virtue of their extremely small size, low power requirement and ease of fabrication in large quantities.

It is important for successful operation of MOS logic circuits of the type described that the output of each stage be driven to unambiguous logic levels in order to drive succeeding stages. The importance of this factor is magnified in connection with the long logic chains (i.e., shift registers having 200 or more bits) commonly utilized in computer circuitry, since any decrease in the strength of the output is cumulative and may result in an erroneous final output from the circuit.

Two factors must be considered in providing adequate driving voltages in circuits of the type described. First, the outputs from each stage tend to be dissipated by the threshold drops inherent in MOS devices. Thus, the output voltage is typically less negative than the supply by one threshold voltage which may be as high as 5 volts. Secondly, in typical clocked circuits, the output voltage tends to dissipate by leakage prior to being sampled by the next stage. The "threshold drop" factor may be compensated for by using increased voltage supplies. However, this increases power dissipation and may involve problems in interfacing with other circuits. Leakage may be minimized by increasing node capacitance but this tends to decrease switching speed.

A more recent circuit innovation designed to insure output signals of sufficient magnitude is the use of what is known as "logical bootstrapping" wherein the output is capacitively coupled to the control terminal of the driving FET in feedback relationship. This expedient, however, is only suitable for non-inverting driver stages wherein the driver is connected to the voltage supply.

It is a primary object of the present invention to provide an improved logic circuit characterized by a unique clocked booster stage for reinforcing a logic output signal.

It is another object of the present invention to provide an improved multistage clocked logic circuit wherein the output of each stage is selectively capacitively coupled to a clock signal source to reinforce the output signal during sampling.

It is yet another object of the present invention to provide an improved MOS shift register adapted to operate at higher clock rates and/or with lower clock amplitudes than heretofore attainable.

It is still another object of the present invention to provide means for selectively capacitively coupling a clock signal to a logic output node in response to the polarity of the output signal appearing at that node.

It is still another object of the present invention to design an MOS logic circuit utilizing the gate to channel capacitance of a MOSFET for selective capacitive coupling in a "logical boot-strap" arrangement.

To these ends, the present invention comprises a unique logical bootstrapping arrangement for use in a synchronous logic circuit wherein a clock signal is selectively capacitively coupled to the logic output node upon the occurrence of one of the two logic output levels, thereby to reinforce the logic output signal. The bootstrapping circuit is here specifically described as applied to a four-phase MOS shift register and comprises a first switching FET having its control terminal connected to a logic output node and one output terminal connected to a clock signal source. Its other output terminal is operatively connected to both output terminals of a second FET, the control terminal of which is connected to the output node. When the output node is charged negatively to the logic "1" condition, the resulting gate to source potential at the second FET causes channel inversion resulting in a high gate to channel capacitance. In addition, the first FET is rendered conductive whereby the clock signal is impressed on the channel of the second FET. As a result, that FET serves to capacitively couple substantially the full amplitude of the negative clock signal to the output thereby to reinforce the logic "1" level thereat.

Upon the occurrence of a logic "0" output, the clock signal is isolated from the output node by the first FET which is rendered nonconductive. In addition, the gate to source potential of the second FET is not sufficient to invert the channel thereof, whereby the capacitance of that FET is maintained small.

In the illustrated embodiment, the operative clock signal utilized to boost the output is the clock controlling the next stage so that the output is boosted just prior to and during sampling. As a result, the booster circuit not only provides for improved high frequency operation (higher clock rates and/or lower clock amplitudes) but also enhances low frequency operation by permitting the circuit to tolerate more leakage between sampling periods.

To the accomplishment of the above and to such other objects as may hereinafter appear, the present invention relates to a booster circuit for MOS logic outputs as defined in the appended claims and as described herein with reference to the accompanying drawings, in which:

The invention is here specifically described as applied to an MOS four-phase shift register. It will be appreciated, however, that the inventive concept here involved may be applicable to shift registers of a different character and indeed to a variety of logic circuit configurations, the specific embodiment here described being merely exemplary.

The invention will best be understood by reference to a typical prior art four-phase shift register circuit. One such circuit is illustrated schematically in FIG. 1 which shows three stages S1, S2 and S3 (1½ bits) of a conventional four-phase MOS shift register. As there illustrated, stage S1 comprises three MOSFETs Q1, Q2 and Q3 having their output circuits connected in series. The upper device Q1 has one output terminal and its gate terminal operatively connected to the $\phi 1$ clock signal source and accordingly functions in the manner of a load resistor. The bottom device Q3 also has one output terminal operatively connected to the $\phi 1$ clock signal source, its gate terminal being operatively connected to the data input. The middle device FET Q2 is controlled at its gate terminal by the $\phi 2$ clock signal source. The data output from this stage is taken from the junction node $n_1$ between the output circuits of FETs Q1 and Q2.

The second stage S2 is identical in configuration to the first stage S1 with the exception that the clock signal sources $\phi 1$ and $\phi 2$ are replaced by clock signal sources $\phi 3$ and $\phi 4$. The input data applied to the gate terminal of the lower device FET Q8 is taken from the output at node $n_1$ of the first stage S1. A capacitor C1 is here illustrated as operatively connected between the data output node $n_1$ of stage S1 and ground and represents the inter-electrode capacitances of the devices connected to that node (herein referred to generally as the node capacitance).

Stages S1 and S2 together define one bit of the register, the output at junction node $n_2$ of stage S2 being applied to the gate terminal of the lower device FET Q13 of stage S3 which defines the first stage of the next bit of the register. While only three stages are here shown for illustrative purposes, it will be appreciated that shift registers of the type described generally comprise hundreds or thousands of bits.

Figure 1:
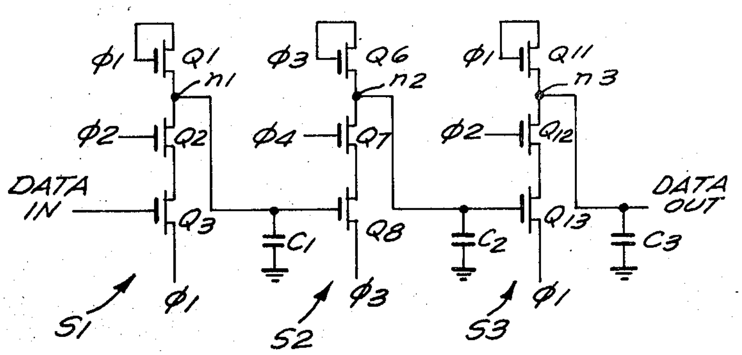
FIG. 1 is a circuit diagram of a typical prior art four-phase MOS shift register.
Figure 3:
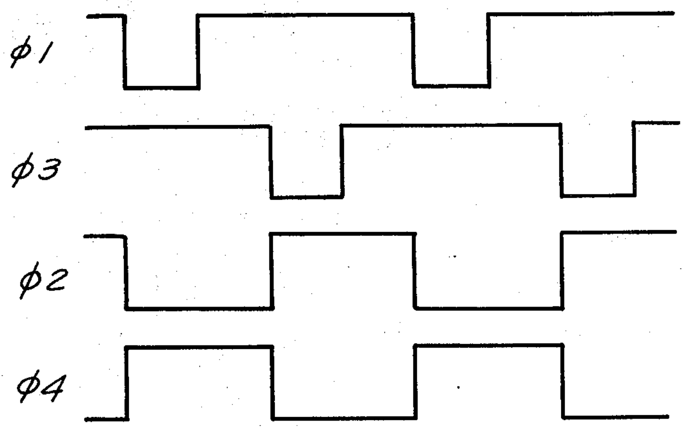
FIG. 3 is a timing diagram of the four clock signals utilized in the circuits of FIG. 1 and FIG. 2.
Figure 3:
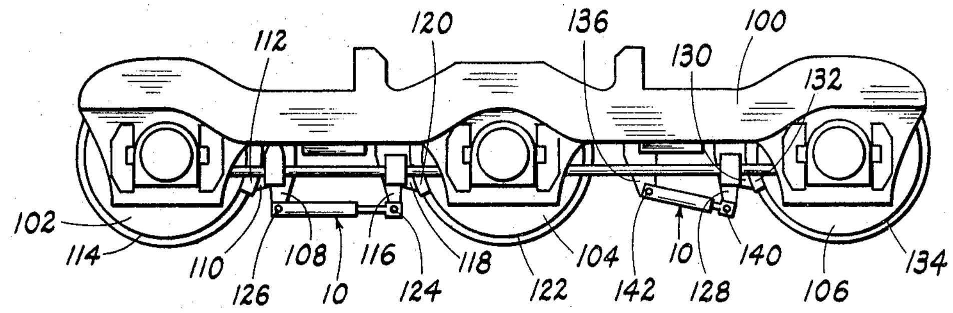
Figure 4:
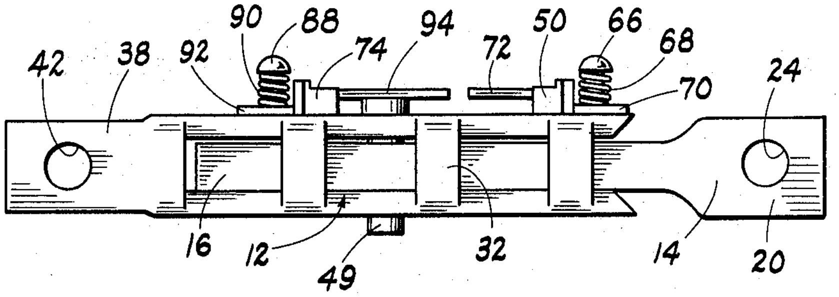
Figure 5:
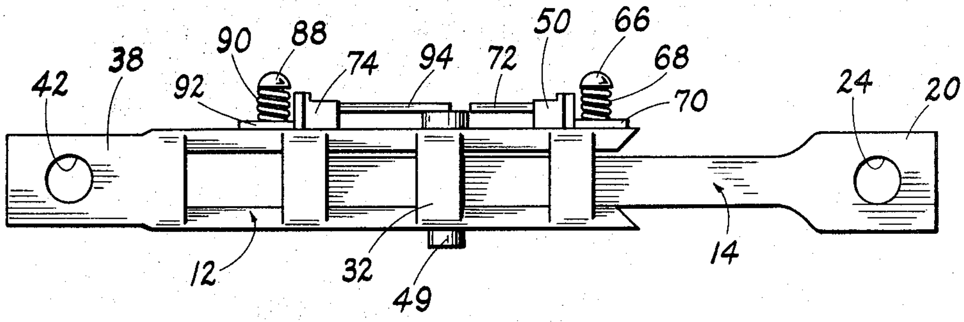
Figure 6:
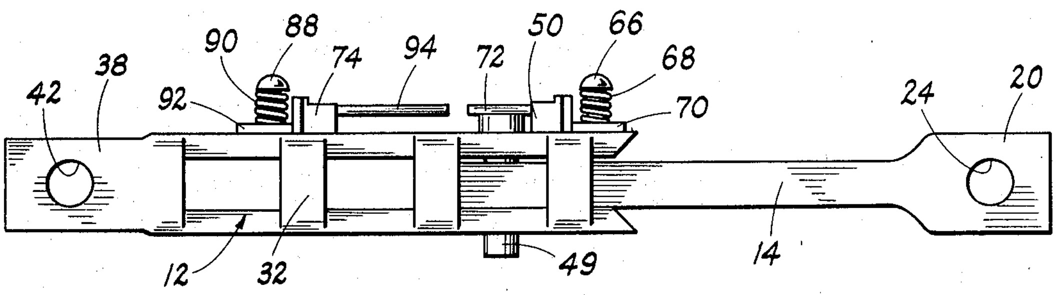

FIG. 3 illustrates graphically the configuration of the clock signals driving the register of FIG. 1. As there shown, clock phases $\phi 2$ and $\phi 4$ comprise consecutive non-overlapping negative going pulses. The $\phi 1$ clock pulse commences substantially simultaneously with the $\phi 2$ clock pulse but has a pulse width approximately half that of the $\phi 2$ signal so that the $\phi 1$ clock pulse is negative for only half of the time that the $\phi 2$ clock pulse is negative. The $\phi 3$ clock pulse bears the same relationship to the $\phi 4$ clock pulse.

The operation of the four-phase shift register of FIG. 1 is characterized by an unconditional charge/conditional discharge mode. Thus as $\phi 1$ goes negative, FET Q1 is rendered conductive thereby to charge capacitor C1 negatively. It will be apparent that capacitor C1 is charged negatively during $\phi 1$ time regardless of the logic level at the data input at the gate of FET Q3. If the input data is at logic "0" (positive), FET Q3 is nonconductive and isolates capacitor C1 from the $\phi 1$ clock at the bottom. On the other hand, if the input data is at logic "1" (negative), FET Q3 is rendered conductive and an additional charging path is available through FETs Q3 and Q2, FET Q2 being rendered conductive at this time by the $\phi 2$ clock signal applied to its gate.

At the end of $\phi 1$ time (when $\phi 1$ goes positive), capacitor C1 is conditionally discharged depending upon the logic level at the data input applied to the gate of FET Q3. Thus if the data input is at logic "0," FET Q3 is rendered nonconductive and provides isolation between capacitor C1 and the $\phi 1$ clock signal which is now at ground. If the data input is at logic "1," FET Q3 is rendered conductive and along with FET Q2, which is maintained conductive during the second half of $\phi 2$ time, provides a discharge path from capacitor C1 to the grounded $\phi 1$ clock signal. As a result, the signal appearing on capacitor C1 at the termination of $\phi 2$ time is the complement of the input data (i.e., the data is inverted during $\phi 2$ time, the first half of the clock cycle). The second half of the cycle proceeds identically to the first except that FETs Q6, Q7 and Q8 of stage S2 are now the active transistors. At the end of $\phi 4$ time, capacitor C2 will be charged or discharged depending upon whether the data stored on capacitor C1 at the end of $\phi 2$ time was positive or negative, respectively. Capacitor C2 will maintain its charge condition during the succeeding $\phi 1$ and $\phi 2$ clock signals so that the data may again be sampled by stage S3 in an identical manner. The above described process continues in each succeeding stage, the input data appearing at the output of the register N clock cycles after it appears at the input, for an N bit shift register.

Four-phase circuitry of the type described is a relatively recent innovation and today is perhaps the most common form of MOS logic. There are several important advantages to circuitry of this type, foremost amoung which is the lower power dissipation. This results primarily from the isolation provided during the charging and discharging of the operative node capacitances. Thus it will be apparent that there is no time when D.C. current flows from ground to the supply. The only power required is the transient needed to charge the node capacitances. Moreover, the node capacitances are typically quite small (i.e. 0.2 pf). As a result, power dissipation is considerably reduced, a factor which is particularly important in connection with large scale computer integration.

Four-phase circuitry of the type described also tends to reduce circuit dimensions and increase speed. This results from the fact that the charging transistor (for example FET Q1 in stage S1) turns off prior to conditional discharge of the operative node capacitance so that if the input data is negative, this capacitance can be discharged without having to buck charging current through a load resistor as would be the case in conventional D.C. and two-phase circuitry. As a result, switching speed is considerably enhanced and the charging devices may be made as small as the fabricating technique will permit.

Notwithstanding the above advantages, the operation of circuitry of the type described is limited considerably both in the high and low frequency ranges both by the magnitude of the available external voltage supply and the leakage characteristics of the circuit. In the high frequency range, it will be apparent that speed is limited by the available clock power—the node capacitances must be charged well above threshold prior to activation of the succeeding stage. Moreover, the external voltage available to drive the circuit is severely limited by the threshold drop inherent in the upper device (for example FET Q1 in stage S1) so that the external clock supply must have magnitudes considerably greater than the operative logic levels required for successful switching. In the low frequency range, it will be apparent that the data must be sampled by the next stage prior to having leaked to a value below the operative logic level required for successful switching. In this regard it will be noted that the operative node capacitances are unconditionally charged during the first quarter ($\phi 1$ time) of the operative clock cycle and are not conditionally discharged until the last quarter (the second half of $\phi 4$ time) of that clock cycle. As a result, the capacitances must be capable of maintaining substantially all of their charge for at least half of the operative clock cycle.

Figure 2:
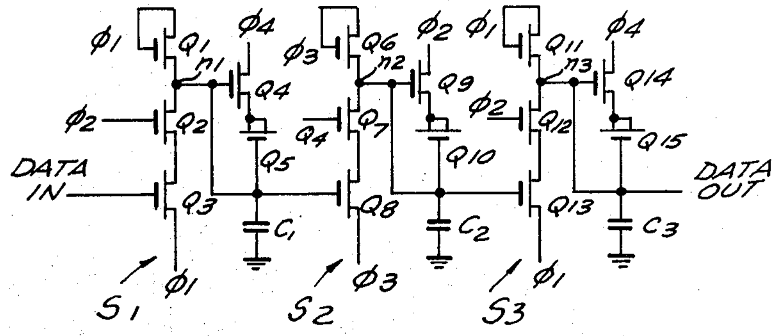
FIG. 2 is a circuit diagram of an MOS shift register incorporating the booster circuit of the present invention.

In accordance with the present invention, the above noted problems of voltage supply strength and leakage are minimized by providing a booster circuit effective to reinforce a logic "1" output signal during the sampling period. As illustrated in FIG. 2, that circuit includes two additional FETs operatively connected to the output line in each stage. Referring to stage S1, it will be seen that those FETs Q4 and Q5 both have their gate terminals connected to the output node $n_1$. One output terminal of FET Q4 is operatively connected to the $\phi 4$ clock source while its other output terminal is connected to both output terminals of FET Q5. The booster circuit of stage S2 is identical to that of S1 with the exception that it is operatively connected to the $\phi 2$ clock signal source.

The circuit operates as follows: During $\phi 1$ time (first half of $\phi 2$ time), the operative circuit node $n_1$ is unconditionally charged negative in the manner previously described with respect to the prior art circuit of FIG. 1. At the termination of $\phi 1$ time (the commencement of the second half of $\phi 2$ time), node $n_1$ and capacitor C1 are conditionally discharged through FETs Q2 and Q3 depending upon the logic level of the input signal impressed upon the gate of FET Q3. If the input is at logic "0," node $n_1$ and capacitor C1 are discharged to ground and FET Q4 is rendered non-conductive thereby to isolate the $\phi 4$ clock signal from the source and drain of FET Q5. Accordingly, when $\phi 4$ goes negative, the only effect on node $n_1$ and capacitor C1 will be a small amount of feed-through resulting from parasitic drain to gate overlap capacitance of FET Q4 which is quite small compared to the total holding capacitance of capacitor C1. As a result, the voltage at the source and drain of FET Q5 will change only slightly and the small drain to gate overlap capacitance of FET Q5 will have little if any effect on the voltage level at capacitor C1.

If, however, the logic level at the input is at logic "0," node $n_1$ and capacitor C1 will be left negatively charged and FET Q4 will be effective to conductively connect the $\phi 4$ clock signal to the drain and source of FET Q5. In addition, the negative potential on capacitor C1 applied to the gate of FET Q5 will cause inversion of the channel between the source and drain of FET Q5 thereby to form an effective large capacitance between the gate and channel of FET Q5. As a result, when $\phi 4$ goes negative, FET Q5, serving as a capacitor for as long as its gate to source potential is large enough to maintain its channel inverted, capacitively couples the $\phi 4$ clock signal to capacitor C1, thereby charging capacitor C1 more negatively just prior to its being sampled by FET Q8 of stage S2 which occurs, it will be noted, during the second half of $\phi 4$. If the gate to channel capacitance of FET Q5 is large compared to the total holding capacitance of capacitor C1, the gate to source potential of FET Q5 will remain relatively constant when $\phi 4$ goes negative, whereby virtually the full amplitude of the $\phi 4$ clock pulse is coupled to capacitor C1 during the first half of $\phi 4$. As a result of the above, even a weak negative output at node $n_1$ is reinforced considerably by a magnitude approaching the full external voltage supply during the first half of $\phi 4$ time, just prior to sampling. Upon sampling of the data on capacitor C1 by FET Q8, the voltage on capacitor C2 of stage S2 is conditionally discharged through FETs Q7 and Q8 and the booster circuit in stage S2 comprising FETs Q9 and Q10 is again operative during $\phi 2$ time on the output at node $n_2$.

It will be appreciated from the foregoing that the novel booster circuit here described provides for substantial reinforcement of a logic "1" output at each stage of a shift register or the like, thereby permitting the circuit to operate at higher clock rates. This is because the operative node capacitances need only be minimally charged by the three-gate shift register stage in order to activate the booster circuit prior to sampling. Moreover, given equal clock rates the circuit of FIG. 2 may be operated with considerably lower clock amplitudes, thereby requiring less power to drive the clocks. Stated in other terms, for a given power, speed of operation may be considerably enhanced and for a given speed, power dissipation may be considerably reduced in comparison to the operation of prior art shift register circuits such as that shown in FIG. 1. Finally, the booster circuit of the present invention may be utilized to enhance low frequency performance since the operative node capacitances may now be allowed to leak to a less negative charge potential (for a logic "1" output) before the circuit stops functioning.

While only a single embodiment of the present invention has been specifically disclosed herein, it will be apparent that many variations may be made therein, all within the scope of the invention, as defined in the following claims.

I claim:

1. In combination with a circuit integrated on a semiconductor substrate, means for selectively capacitively coupling a signal to a signal node comprising a field effect transistor having a gate terminal and an output circuit defined by spaced source and drain regions, a conductive channel being formed between said source and drain regions in response to a given potential difference between said gate terminal and one of said source and drain regions, said gate terminal being operatively connected to said signal node, and a pulse signal source operatively connected to at least one of said source and drain regions, and means for charging said signal node to a level corresponding to said given potential difference thereby to form said conductive channel in said substrate and to capacitively couple said pulse signal to said signal node.

2. The integrated circuit of claim 1, further comprising a second signal source and means responsive to said second signal source for selectively connecting said at least one of said source and drain regions to said first signal source.

3. The integrated circuit of claim 2, wherein said signal node is operatively connected to said second signal source independently of said field effect transistor, said second signal source comprising said charging means.

4. The integrated circuit of claim 2, wherein said first signal source is a clock signal source and said second signal source is a data signal source, said signal node being adapted to store a data signal.

5. The integrated circuit of claim 2, wherein said connecting means comprises a switching device having a control terminal operatively connected to said second signal source and an output circuit operatively connected between said first signal source and said at least one of said source and drain regions.

6. The integrated circuit of claim 5, wherein said signal node is operatively connected to said second signal source independently of said field effect transistor, said second signal source comprising said charging means.

7. The integrated circuit of claim 6, wherein said first signal source is a clock signal source and said second signal source is a data signal source, said signal mode being adapted to store a data signal.

8. The integrated circuit of claim 3, wherein said first signal source is a clock signal source and said second signal source is a data signal source, said signal node being adapted to store a data signal.

9. The circuit of claim 1, in which said pulse signal source is connected to both of said source and drain regions.

10. In a circuit adapted to shift data signals at one of two logic levels comprising a plurality of stages each having an input node and an output node, means to charge said output node to a first or second logic level corresponding to the signal at said input node, the improvement comprising a pulse signal source and means responsive to the logic level at said output node for selectively coupling said pulse signal source to said output node.

11. The circuit of claim 10, in which said coupling means is a capacitive coupling means.

12. The circuit of claim 10, wherein said coupling means comprises a switching device having a control terminal and first and second output terminals, said control terminal being connected to said output node and said first output terminal being connected to said signal source, and a coupling capacitor operatively connected between said second output terminal and said output node.

13. The circuit of claim 12, wherein said coupling capacitor comprises a field effect transistor having a gate terminal and an output circuit defined by a pair of source and drain regions, said gate terminal being connected to said output node and at least one of said source and drain regions being connected to said second output terminal of said switching device.

14. The circuit of claim 13, in which said second output terminal of said switching device is connected to both said source and drain regions.

15. A four-phase shift register comprising a plurality of stages connected in cascade, each having an input node and an output node, means for unconditionally charging the output node of one stage during a first clock interval, means responsive to the signal level at the input node of said one stage for conditionally discharging the output node thereof to a second logic level during a second interval, means for unconditionally charging the output node of the next stage during a third interval and means, responsive to the signal level at the input node of said next stage, for conditionally discharging the output node thereof during a fourth interval, and so on for the remaining stages of said circuit, the improvement comprising a signal source and means operatively connected between said output node of said one stage and said signal source responsive to the level at said output node of said one stage, and effective to couple said signal source to said output node of said one stage during said fourth interval upon the occurrence of one only of said two logic levels at said output of said one stage.

16. The shift register of claim 15, in which said coupling means is a capacitive coupling means.

17. The shift register of claim 15, wherein said coupling means comprises a switching device having a control terminal and first and second output terminals, said control terminal being connected to said output node and said first output terminal being connected to said signal source, and a coupling capacitor operatively connected between said second output terminal and said output node.

18. The shift register of claim 17, wherein said coupling capacitor comprises a field effect transistor having a gate terminal and an output circuit defined by a pair of source and drain regions, said gate terminal being connected to said output node and at least one of said source and drain regions being connected to said second output terminal of said switching device.

19. The shift register of claim 18, wherein said second output terminal of said switching device is connected to both said source and drain regions.

* * * * *

UNITED STATES PATENT OFFICE
CERTIFICATE OF CORRECTION

Patent No. 3,794,856 Dated February 26, 1974

Inventor(s) Lamar T. Baker

It is certified that error appears in the above-identified patent and that said Letters Patent are hereby corrected as shown below:

On the first sheet of the drawing, delete "SHEET 1 of 2" and insert -- SHEET 1 of 1 --. cancel the second sheet of the drawing.

Signed and sealed this 24th day of September 1974.

(SEAL)
Attest:

McCOY M. GIBSON JR.
Attesting Officer

C. MARSHALL DANN
Commissioner of Patents